United States Patent [19]

Jarrett et al.

[11] 4,121,273
[45] Oct. 17, 1978

[54] CRUISE CONTROL METHOD AND APPARATUS

[75] Inventors: Robert Benjamin Jarrett; Wilson David Pace, both of Tempe; Howard Fredrick Weber, Scottsdale, all of Ariz.

[73] Assignee: Motorola, Inc., Schaumburg, Ill.

[21] Appl. No.: 759,516

[22] Filed: Jan. 14, 1977

[51] Int. Cl.² .............................................. B60K 31/00
[52] U.S. Cl. ................................... 361/239; 123/102; 180/105 E; 361/242
[58] Field of Search .............................. 361/239, 242; 180/105 E, 109; 123/102; 318/603

[56] References Cited

U.S. PATENT DOCUMENTS

| | | | |
|---|---|---|---|
| 3,599,154 | 8/1971 | Carol, Jr. et al. | 361/242 X |
| 3,949,359 | 4/1976 | Sorkin | 180/105 E X |
| 3,952,829 | 4/1976 | Gray | 361/239 X |

*Primary Examiner*—Patrick R. Salce
*Attorney, Agent, or Firm*—Joe E. Barbee

[57] ABSTRACT

A cruise control system having means to provide a signal corresponding to a desired speed for use by a servo control to regulate the speed. This system uses a current source to ramp charge a first capacitor. A comparator compares magnitude of the voltage on the first capacitor against the signal representative of the desired speed. A first counter is used to accumulate counts from a first frequency generator. A latch counter capable of following the counts in the first counter is used to store the counts when the comparator indicates the voltage on the first capacitor is substantially equal to the magnitude of the signal representative of the speed. A digital comparator then compares the counts stored in the latch counter against counts being accumulated anew in the first counter while the first capacitor is being recharged. Means are provided to inhibit the first capacitor from being charged further after the digital comparator indicates equality between the quantity of the counts being compared. Means to transfer the voltage on the first capacitor to a second capacitor are used so that the voltage on the second capacitor can be compared against the signal representative of the actual speed which then provides an output to the servo control to regulate the speed.

12 Claims, 3 Drawing Figures

CRUISE CONTROL METHOD AND APPARATUS

BACKGROUND OF THE INVENTION

This invention relates to speed control systems, and more particularly, to cruise control systems for controlling cruising speed of a motorized vehicle and a method therefor.

Various cruise control systems have been used with automobiles to maintain an automobile at a desired cruising speed. Typically, the driver of the automobile achieves the desired cruising speed and then activates a cruise control system which maintains the automobile at the achieved driving speed. In the past, cruise control systems have been proposed including one which used a digital-to-analog converter. However, most digital-to-analog converters fabricated with integrated circuits require a relatively large die area to make the circuit chip and also require rather accurate classical R-2R ladder networks. The present invention overcomes these and other shortcomings of using a digital-to-analog converter in a cruise control system. Also, in the past a telemetry system that employed sample and hold circuits has been modified to replace the sample and hold circuits by an analog-to-digital converter having an R-2R ladder network. However, it will be recognized that the present invention does more than employ a simple sample and hold circuit.

Accordingly, one of the objects of the present invention is to provide a cruise control integrated circuit which can be fabricated without the use of an accurate resistive network and an extremely large die area normally associated with digital-to-analog converters.

Another object of the invention is to provide a cruise control circuit that can use relatively inexpensive capacitors.

Yet another object of the present invention is to provide a cruise control system wherein the preselected speed can be gradually increased by the use of a low frequency pulse generator incrementing a latched counter.

SUMMARY OF THE INVENTION

In carrying out the above and other objects of the invention in one form, there is provided an improved speed control system for use in controlling speed of a device. One illustrated embodiment of the invention has a first capacitor that can be charged from a current source. A counter accumulates counts from a frequency generator while the capacitor is being charged. A comparator compares magnitude of the voltage on the capacitor against a signal representative of the desired speed of the device. A latch counter is provided which is capable of storing the accumulated count once the voltage or charge on the capacitor reaches the magnitude of the signal representative of speed. A digital comparator is then used to compare counts latched in the latch counter against counts being accumulated in the first counter. Means are also provided to inhibit the capacitor from being charged further once the digital comparator indicates equality of counts being compared. Means to transfer the voltage on the first capacitor to a second capacitor are also provided so that the charge on the second capacitor can be compared against the signal representative of speed thereby providing an output which can be used by a servo control system in order to regulate speed of the device.

Also provided is a method of storing a voltage which corresponds to speed of a device. A counter is incremented by an oscillator until an independent capacitor has ramped from a reference voltage to a voltage equal to speed of the device. The count is stored in a latch counter once the capacitor has been ramped to a voltage equal to the speed of the device. This voltage can now be reproduced by allowing the capacitor to repeatedly ramp to a level corresponding to speed, for a period of time corresponding to the stored count. The peak voltage achieved on the capacitor is transferred through a buffer to a storage capacitor. The voltage on the storage capacitor is periodically refreshed by repeatedly allowing the first capacitor to charge and then transferring the charge to the storage capacitor. The voltage stored in the storage capacitor is used by a comparator to compare against a signal representative of the speed of the device thereby determining whether a correction of device speed should be made or not.

The subject matter which is regarded as the instant invention is set forth in the appended claims. The invention itself, however, together with further objects and advantages thereof, may be better understood by referring to the following detailed description taken in conjunction with the accompanying drawings.

The exemplifications set out herein illustrate the preferred embodiments of the invention in one form thereof, and such exemplifications are not to be construed as limiting in any manner.

DESCRIPTION OF THE PREFERRED EMBODIMENTS

Figure 1:
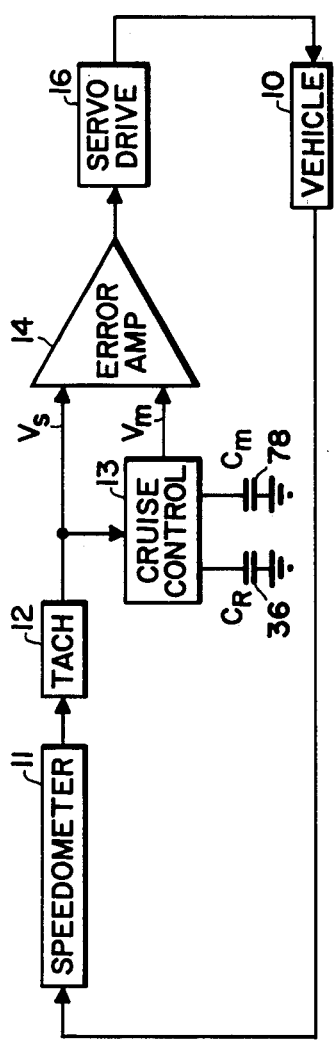
FIG. 1 is a block diagram of a speed control system wherein the invention is used.

Referring first to FIG. 1 there is shown a vehicle or device 10 whose speed it is desired to control. A speedometer 11 provides an indication of the speed of the vehicle or device 10 to tachometer 12. Tachometer 12 provides an output signal, $V_s$, which is representative of the speed of vehicle 10. This signal is preferably a dc voltage which may contain some ripple. The output signal from tachometer 12 is coupled to error amplifier 14 and also to control circuitry 13. Circuitry 13 allows capacitor 36 to be ramp charged to a value equivalent to the output voltage from tachometer 12. The peak voltage stored on capacitor 36 can be transferred to storage or memory capacitor 78. Thus, capacitor 36 can be discharged and recharged repeatedly to a voltage equivalent to the output of tachometer 12 when the cruise control system was activated. By repeatedly charging capacitor 36 and transferring the charge to capacitor 78, capacitor 78 will always be maintained at the desired peak voltage. The voltage stored by capacitor 78 is then sent to error amplifier 14 where it is compared against the latest voltage out of tachometer 12. The output of error amplifier 14 is used by servo drive 16 to either increase or decrease the speed of vehicle 10 dependent upon whether the signal out of tachometer 12 decreases or increases. As will be understood by those skilled in the art, the output of servo drive 16 would typically control the throttle on a motorized vehicle.

Whenever the operator of vehicle 10 achieves the desired cruising speed, tachometer 12 produces an output voltage which is reproduced as an equivalent voltage on capacitor 36. From then on, provided no other inputs to the cruise control system are changed, capacitor 36 will continue to repeatedly discharge and recharge to the equivalent voltage since the length of time that capacitor 36 is allowed to charge is controlled by a counter as will be explained hereinafter. The charge on capacitor 36 is transferred to capacitor 78 where it is then compared against the present-time output of tachometer 12 to determine whether a correction in vehicle speed is necessary.

Figure 2:
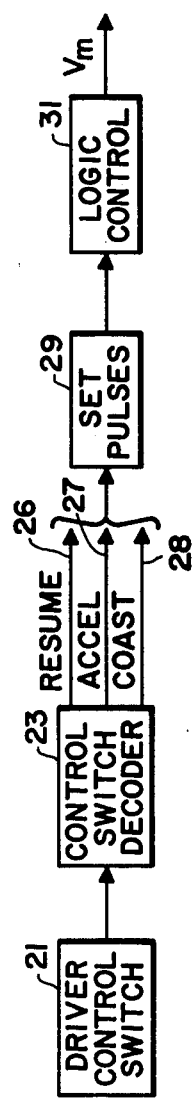
FIG. 2 illustrates in block diagram form in greater detail a portion of the circuitry of FIG. 1.

FIG. 2 illustrates in block diagram form in greater detail a portion of cruise control 13 of FIG. 1. Driver control switch 21 is a switch that is actuated by the driver of the vehicle and, in the conventional cruise control system, allows the driver to turn the system on or off or to select a mode of operation of the system. One such mode is resume speed which is used should the driver have to apply the brakes of the vehicle which normally causes the cruise control system to be deactivated. After the brake has been released the operator can energize a resume speed switch and the cruise control system will re-engage and accelerate the vehicle to the speed which was preselected prior to application of the brakes. Another mode of operation is accelerate and this is used when the driver wishes to increase the speed of a vehicle to a higher speed than a previously preselected cruising speed. Another mode the driver can select is a coast mode which is used when the driver wishes to reduce the preselected speed of the automobile to a new lower cruising speed. The driver control switch 21 is connected by line 22 to a control switch decode 23 which decodes the driver control switch 21 output and generates the proper command for the cruise control system. Driver control switch 21 may be any desired type of switch, however, it is preferable for switch 21 to be arranged so that it taps off different voltage values from a voltage divider for the different commands desired and in such a situation line 22 would be a single line connection between switch 21 and decoder 23. Three main outputs are associated with decoder 23 and these outputs are resume speed 26, accelerate 27 and coast 28 which are then fed to circuitry 29 which generates set and reset pulses which are used in logic control 31. The output of logic control 31 is a voltage Vm which corresponds to the preselected cruising speed.

Figure 3:
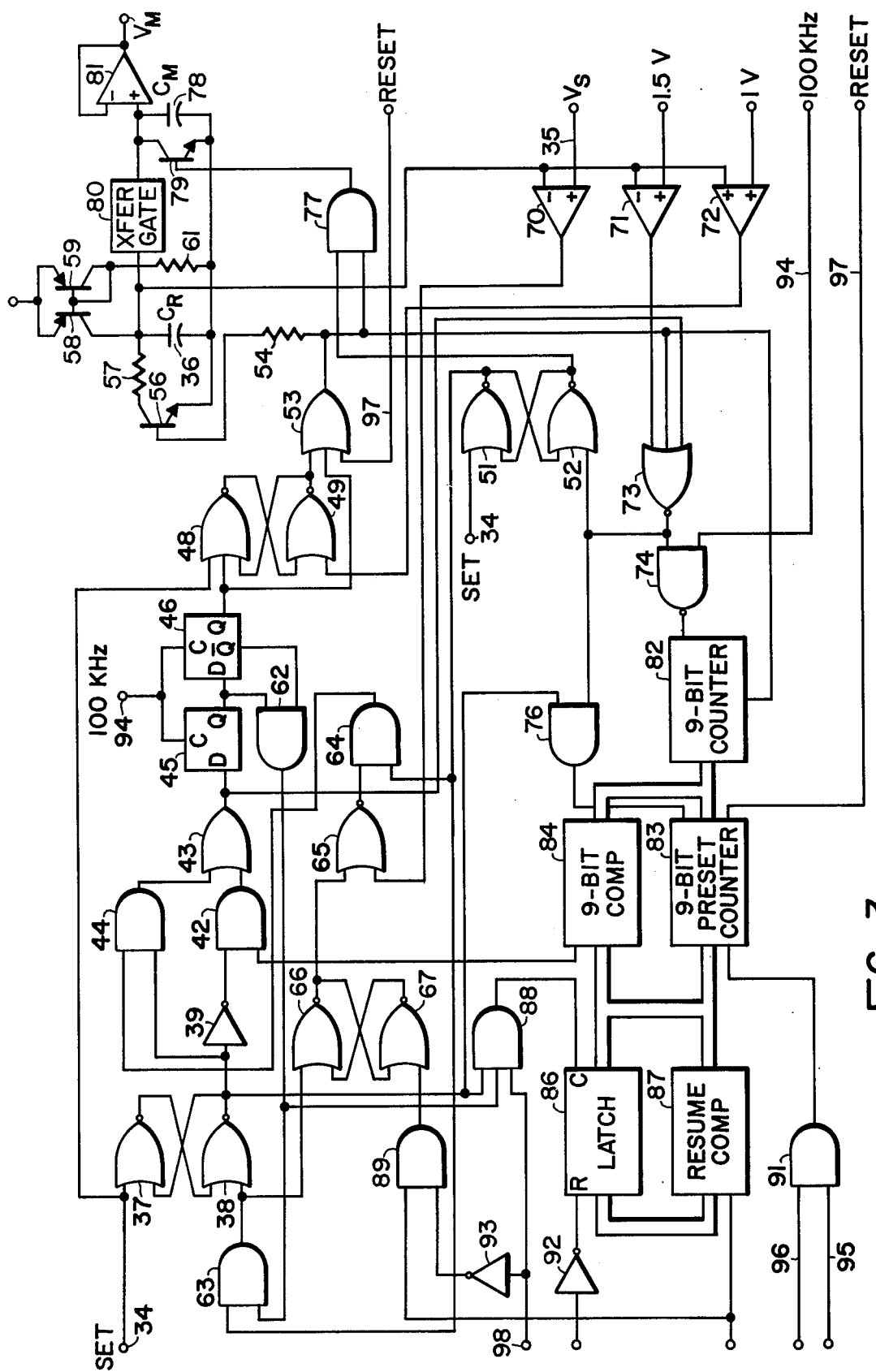
FIG. 3 illustrates in schematic form a portion of the circuitry of FIG. 1.

FIG. 3 is a schematic diagram of logic control 31 of FIG. 2 along with capacitors 36 and 78. Transistors 58 and 59, together with resistor 61, form a current source to charge capacitor 36. Capacitor 36 is allowed to charge in a linear manner and therefore the voltage developed across the capacitor 36 has a ramped waveform. The voltage across capacitor 36 can be discharged by energizing transistor 56 thereby allowing current to flow through resistor 57 and transistor 56 to discharge capacitor 36. However, the voltage across capacitor 36 is never discharged below one volt. This is accomplished by comparator 72 which has its inverting input tied to capacitor 36 and its noninverting input tied to a one volt reference source. When the voltage across capacitor 36 decreases to a 1 volt value the output of comparator 72 appears as a logic one to NOR gate 49 thereby causing the output of NOR gate 49 to become a logic zero which is coupled to OR gate 53. Since the other inputs to OR gate 53 are also zeros, the output of OR gate 53 is at zero, thereby de-energizing transistor 56 so that capacitor 36 does not become discharged below the one volt level. The reason capacitor 36 is not discharged below the one volt level is to keep the capacitor charging in the linear region of its charging curve. NOR gate 49, along with NOR gate 48, form an RS flip-flop whose operation will be explained in greater detail hereinafter.

A reset pulse is generated by circuitry 29 of FIG. 2 and fed on line 97 to OR gate 53 and to a 9-bit preset counter 83. This reset pulse resets the 9-bit preset counter 83 and also causes OR gate 53 to produce a logic high or one which energizes transistor 56 thereby discharging capacitor 36. Following the reset pulse, circuitry 29 also generates a set pulse which is fed on line 34 to NOR gate 37 and to NOR gates 48 and 51. NOR gate 37 is interconnected with NOR gate 38 to form an RS flip-flop while NOR gate 51 is interconnected with NOR gate 52 also forming an RS flip-flop. The set pulse appearing on line 34 sets the output state of these flip-flops. The set pulse on the input of NOR gate 51 causes a logic zero to appear on the output of NOR gate 51 which is then fed to AND gate 64 and to AND gate 63. The output of AND gate 63 is a logic zero since one of its inputs is a zero. The set pulse on the input of NOR gate 37 causes the output of NOR gate 37 to be a logic zero which is fed to the input of NOR gate 38. Since now NOR gate 38 has two zeros on its inputs, its output becomes a logic one. This logic one appears on one of the inputs of AND gate 44 and also at an input to inverter 39. The output of AND gate 44 will be a logic zero until the voltage across capacitor 36 equals the voltage indicative of speed, $V_s$, appearing on terminal 35. Inverter 39 inverts the logic 1 to a logic 0 which is connected to one of the inputs of AND gate 42. This causes the output of AND gate 42 to be a zero also.

In the meanwhile, capacitor 36 has been charging up from the one volt level and as it reaches 1.5 volts, comparator 71 generates an output signal equivalent to a logic zero. Comparator 71 has its inverting input connected to the output of capacitor 36 while its noninverting input is connected to a 1.5 volt reference. Therefore, when the charge across capacitor 36 reaches the 1.5 volt level, comparator 71 generates a signal equivalent to a logic zero which is connected to one of three inputs of NOR gate 73. The second input to NOR gate 73 is connected to the output of OR gate 53 which is also a zero otherwise transistor 56 would be energized thereby discharging capacitor 36. The third input to NOR gate 73 is connected to the output of OR gate 43. The output of OR gate 43 is a logic zero since both of its inputs are logic zeros. Now, as the charge on capacitor 36 reaches 1.5 volts, comparator 71 generates a logic zero which causes the output of NOR gate 73 to go from a logic zero to a logic one. The output of NOR gate 73 is connected to three different logic gates. One such gate is NAND gate 74 which is implemented to pass pulses on line 94 which are generated by a pulse generator. The pulses pass through gate 74, when gate 74 is enabled, to a 9-bit counter 82. The other gates connected to the output of NOR gate 73 and their function will be discussed hereinafter.

One of the other logic gates tied to the output of NOR gate 73 is a NOR gate 52. The output of gate 73 resets the RS flip-flop formed by NOR gates 51 and 52 thereby causing a logic zero to be on the output of NOR gate 52 and a logic one on the output of NOR gate 51. This places a logic one on one of the inputs for AND gate 64. The logic zero on the output of NOR gate 52 is coupled to AND gate 77 and disables AND gate 77 so that transistor 79 does not become energized and discharge capacitor 78.

The charge on capacitor 36 is also monitored by a comparator 70 which compares the charge on capacitor 36 against a voltage, $V_s$, which is representative of the speed of the vehicle. This voltage, $V_s$, is generated by tach 12 of FIG. 1. As the voltage across capacitor 36 equals the voltage, $V_s$, representative of the speed of the vehicle, comparator 70 produces a logic one output which is connected to OR gate 65 thereby causing the output of OR gate 65 to be a logic one. AND gate 64 thus has logic ones on both of its inputs thereby causing a logic one on its output which is connected to one of the imputs of AND gate 44. As discussed hereinabove, the other input to AND gate 44 was a logic one coming from the output of NOR gate 38. Since both inputs are now ones, the output of AND gate 44 becomes a logic one which is connected to the input of OR gate 43. The logic one on the input of OR gate 43 causes its output to go to a logic one also. This logic one is connected to NOR gate 73 and to a D-type flip-flip 45. The logic one on the input of NOR gate 73 causes its output to go a logic zero thereby disabling NAND gate 74 so that counter 82 does not receive any more pulses.

D-type flip-flop 45 has a clock input which is the same pulse signal that is received by NAND gate 74 on line 94. The logic one on the input of flip-flop 45 causes its Q output to also become a one when the clock input is present. The Q output of flip-flop 45 is connected to another D-type flip-flop 46 and also to AND gate $\overline{62}$. The other input to AND gate 62 is connected to the Q output of flip-flop 46 which is a logic one until the clock input changes the state of flip-flop 46. Therefore, AND gate 62 will have two logic ones on its input causing a logic one at its output which is connected to one of the inputs of AND gate 63. AND gate 63 now has logic ones on both of its inputs thereby causing its output to also be a logic one. The output of AND gate 63 is connected to NOR gate 38 and to NOR gate 66. The logic one on the input of NOR gate 38 causes the RS flip-flop formed by NOR gates 37 and 38 to be reset, thereby changing the output of NOR gate 38 to a logic zero. The effect of this change of logic outputs for NOR gate 38 will be discussed hereinafter.

The logic one on the input of D-type flip-flop 46 causes its Q output to go to a logic one on the next clock input, thereby placing a logic one on one of the inputs of NOR gate 48 and one of the inputs of OR gate 53. The logic one on the input of OR gate 53 causes its output to also be a logic one thereby energizing transistor 56 and discharging capacitor 36. The logic one on the input of NOR gate 48 causes its output to go to a logic zero which is connected to the input of NOR gate 49. The other input of NOR gate 49 is connected to the output of comparator 72 which compares the voltage across capacitor 36 to a one volt reference. The output of comparator 72 is normally a logic zero until the charge across capacitor 36 reaches a 1 volt level and then the output changes to a logic one which is connected to one of the inputs of NOR gate 49 and causes the output of NOR gate 49 to become a logic zero thereby de-energizing transistor 56 so that capacitor 36 will not be discharged below the one volt level. The output from flip-flop 46, which is connected to one of the inputs of OR gate 53, is a redundant feature which is not always required since the flip-flop formed by NOR gates 48 and 49 enables OR gate 53 as does the direct connection from the output of flip-flop 46 to the other input of OR gate 53.

Now, going back to the output of NOR gate 38 which is tied to one of the inputs of AND gate 76, when the output of NOR gate 73 goes to a logic one the output of AND gate 76 also becomes a logic one. The output of AND gate 76 is connected to the preset input of 9-bit preset counter 83 and causes counter 83 to store whatever count is contained in the counter at that time. The input to counter 83 is connected to the output of counter 82 and therefore counter 83 contains the same count that was in counter 82 at the time the output of OR gate 43 caused the disablement of NAND gate 74.

Up to this point the activation of the cruise control system has been described wherein counts equivalent to a preselected speed were stored and capacitor 36 was allowed to charge up to a voltage equivalent to speed and its output used to prevent the counter from accumulating more counts. Now the cruise control system will regulate the speed of the vehicle to maintain it at the preselected speed. Capacitor 36 will be repeatedly charged and discharged.

Going back, once again, to the output of NOR gate 38 which is now sitting at a logic zero, thereby disabling AND gate 44 and getting inverted by inverter 39 so that logic gate 42 now has a logic one on one of its inputs. The other input to AND gate 42 is connected to an output of a 9-bit comparator 84. Comparator 84 receives the count contained in counter 82 and compares this count against the counts stored in preset counter 83 once a set up cycle establishing the count in counter 83 has been completed. Capacitor 36 is allowed to charge during the time that comparator 84 is comparing the counts. Once the counts accumulating in counter 82 are equal to the counts stored in preset counter 83, comparator 84 sends a logic one signal to one of the inputs of AND gate 42. The output of AND gate 42 then becomes a logic one which is connected to one of the inputs of OR gate 43 thereby making the output of OR gate 43 a logic one causing a logic one to be clocked through flip-flops 45 and 46. A logic one on the output of flip-flop 46 is connected to one of the inputs of OR gate 53 thereby, once again, energizing transistor 56 and discharging capacitor 36 as discussed hereinabove. Since capacitor 36 is allowed to charge for a period of time equivalent to the time it was charging when its voltage was being compared to the voltage representative of speed of the vehicle, the peak charge achieved on capacitor 36 will always be equivalent to the voltage representative of the preselected speed of the vehicle.

A transfer gate 80 is connected to capacitor 36 and to a second storage or memory capacitor 78. Thus, prior to capacitor 36 being discharged each time it reaches a voltage equivalent to the voltage representative of the speed of the vehicle, the peak voltage on capacitor 36 is transferred to capacitor 78. By repetitively transferring the peak voltage on capacitor 36 to capacitor 78, capacitor 78 will always be charged to a voltage equivalent to the voltage representative of speed of the vehicle. By repeatadly charging capacitors 36 and 78, it is not necessary that these capacitors have a very low leakage rate. This, of course, permits the use of low price capacitors. Transfer gate 80 is a current source only and is not a current sink, therefore, gate 80 does not drain any charge from capacitor 78 even when capacitor 36 contains a lower charge than capacitor 78. Connected in parallel with capacitor 78 is a transistor 79. The base of transistor 79 is connected to the output of AND gate 77. AND gate 77 is enabled when the system is first set up. Enabling gate 77 energizes transistor 79 and, thus, discharges capacitor 78. Capacitor 78 is also connected to a noninverting input of an operational amplifier 81 which serves as a buffer. The output of buffer 81 is connected to one of the inputs of error amplifier 14, in FIG. 1, where it is compared against the voltage representative of the present-time speed of the vehicle.

Preset counter 83 has a clock input which is connected to the output of AND gate 91. AND gate 91 has two inputs, 95 and 96. Input 95 is connected to a low frequency pulse generator which operates low frequency pulses such as, for example, 7.5 hertz. Input 96 is connected to circuitry 29 of FIG. 2 and receives a signal which enables AND gate 91 to pass the low frequency pulses appearing on input 95. These low frequency pulses increment the count stored in preset counter 83 which in turn causes the vehicle to increase speed. Increasing the counts in preset counter 83 at 7.5 hertz can be equivalent to accelerating the vehicle at approximately one and a half miles-per-hour. Preset counter 83 is also connected to an 8-bit latch 86. 8-bit latch 86 stores the eight most significant bits from preset counter 83. The least significant bit is only equivalent to approximately two-tenths of a mile-per-hour and is not significant enough to be carried by 8-bit latch 86. Latch 86 is used to store the counts in preset counter 83 for future reference. When the brakes of the vehicle are applied, the cruise control system is automatically disengaged and, as described hereinabove, preset counter 83 is reset. Thereafter, if it is desired to resume the speed of the vehicle that was preselected prior to application of the brakes all that is necessary is for the driver of the vehicle to energize a resume switch which causes a signal on line 98 to enable AND gate 88 thereby transferring the counts latched in 8-bit latch 86 to the output of the latch so that the counts stored in 8-bit latch 86 can be compared in resume comparator 87 against the counts being accumulated by preset counter 83. When the counts in preset counter 83 reach the same number as the count stored in latch 86 then counts are no longer allowed to enter preset counter 83. During the resume period AND gate 91 is enabled by the proper input on input 96 thereby allowing the counts in preset counter 83 to increase at a low count rate which means that the vehicle is accelerating at approximately one and a half miles-per-hour. Therefore, by enabling gate 91 the counts in preset counter 83 can be increased to allow the vehicle to resume its previously preselected speed or even to allow the presently preselected speed to be increased. When resume comparator 87 indicates that the counts in preset counter 83 are equal to the counts stored in latch 86 AND gate 89 is enabled which causes a flip-flop formed by NOR gates 66 and 67 to be toggled. The purpose of the flip-flop formed by NOR gates 66 and 67 is to prevent resuming a speed which is higher than the speed that was preselected prior to application of the brakes. One of the inputs to AND gate 89 is coupled to line 98 through an inverter 93. 8-bit latch 86 is also connected to an inverter 92 which passes a signal from circuitry 29 of FIG. 2 to latch 86 resetting latch 86 when the cruise control system is first energized.

It is to be understood, of course, that this system has been described, by way of illustration only, as a cruise control system for a motorized vehicle, and that other applications of this system to control speed of rotating or other driven devices may be used if desired.

It will now be appreciated that we have provided an improved cruise control system which does not require the classical R-2R latter digital-to-analog converter. In some digital-to-analog systems, MOSFETS are used which require special handling during manufacturing of the system. The use of MOSFETS is not required by the present invention. In addition, instead of requiring expensive capacitors of relatively high microfarads and of low leakage current the capacitors used in the present system can be low cost items since they can be of low microfarads and do not require low leakage specifications. Since the capacitors are continuously peak charged leakage does not become a problem. Another of the advantages of the present invention is that all of the circuitry of FIG. 2 and FIG. 3, with the exception of the driver control switch and capacitors 36 and 78, can all be manufactured on one integrated circuit chip thereby permitting the use of a low number of interface pins on the board on which the chip is to be mounted. This greatly simplifies manufacturing and reduces manufacturing costs.

Consequently, while in accordance with the Patent Statutes, there has been described what at present are considered to be the preferred forms of this invention it will be obvious to those skilled in the art that numereous changes and modifications may be made herein without departing from the true spirit and scope of the invention, and it is therefore aimed in the following claims to cover all such modifications.

What is claimed as new and desired to secure by Letters Patents of the U.S. is:

1. A cruise control system for a motorized vehicle having speed monitoring means to produce an electrical signal indicative of vehicle speed and a servo control to perform vehicle speed changes, the cruise control system further comprising: a first capacitor to store a voltage; a constant current source coupled to the first capacitor; means to inhibit the constant current source upon a predetermined command; a comparator having a first and a second input and output, the first input being coupled to the first capacitor, the second input receiving from the speed monitoring means the electrical signal indicative of vehicle speed, the comparator producing a desired output when the voltage stored by the first capacitor equals in magnitude the electrical signal indicative of vehicle speed; a pulse generator; means coupled to the pulse generator which can be enabled at substantially the same time the constant current source is enabled; a first counter to receive pulses from the pulse generator when the means coupled to the pulse generator is enabled; a preset counter which receives an output count from the first counter so that the count contained in the preset counter equals the count being accumulated in the first counter, the preset counter being capable of storing a count contained within the preset counter upon a preset input to the preset counter; means to generate a reset input for the first counter and a preset input for the preset counter when the voltage stored by the first capacitor equals in magnitude the electrical signal indicative of vehicle speed; a digital comparator to compare counts from the first counter with counts stored in the preset counter and to generate an output signal when the compared counts are equal; means responsive to the output signal generated by the digital comparator, the means responsive providing a signal indicative of a desired cruising speed of the vehicle; and means to compare the signal indicative of the desired cruising speed with the electrical signal indicative of actual vehicle speed so that the means to compare can produce an output for use by the servo control to regulate speed of the vehicle.

2. The cruise control system of claim 1 wherein the means responsive to the output signal generated by the digital comparator includes a storage capacitor which stores a voltage substantially equal to the voltage stored by the first capacitor.

3. The cruise control system of claim 1 further having a second pulse generator which produces pulses at a lower frequency than the pulse generator; a gating means wherein output pulses of the second pulse generator are coupled to the preset counter when the gating means is enabled thereby allowing counts stored in the preset counter to be increased slowly which in turn causes the vehicle to accelerate.

4. A speed control system having a means to provide a signal indicative of speed of a device and a servo control to control the speed of the device, further comprising: a first capacitor to store a voltage; a constant current source coupled to the capacitor; means to allow the first capacitor to charge up and to be discharged upon command; a comparator to compare magnitude of the voltage charged in the first capacitor with the signal indicative of speed of the device; a first pulse generator to provide pulses; a first counter to receive the pulses from the pulse generator; means to inhibit the pulses from reaching the first counter; a second counter to receive the counts from the first counter, the second counter having the capability to be latched up thereby storing the count contained within the second counter, the second counter being latched up when the comparator produces an output indicating equality between the voltage charged in the capacitor and the signal indicative of speed of the device; a digital comparator to compare the count stored within the second counter with a count being accumulated in the first counter and producing an output when both counts are equal thereby inhibiting the first capacitor from being charged further; and a second capacitor to which is transferred a voltage equal to the voltage on the first capacitor, the voltage on the second capacitor providing a reference to be compared against the signal indicative of speed of the device so that a speed adjusting signal can be provided to the servo control thereby controlling speed of the device.

5. The speed control system of claim 4 further having a second pulse generator to provide pulses at a lower frequency than the first pulse generator, the second pulse generator being coupled to the second counter in a manner to increment the counts stored in the second counter thereby providing a means to increase speed of the device.

6. A method of controlling cruising speed of a vehicle, comprising: obtaining a signal indicative of speed of the vehicle; allowing a first capacitor to be charged and accumulating counts in a first counter; comparing the charge on the first capacitor with the signal indicative of speed of the vehicle; storing a count in a second counter which corresponds to the counts accumulated in the first counter when the charge on the first capacitor equals magnitude of the signal indicative of speed; discharging the first capacitor once the counts are stored in the second counter; once again allowing the first capacitor to charge up and transferring the charge to a second capacitor; allowing the first counter to once again accumulate counts; inhibiting additional charging of the first capacitor once the counts being accumulated in the first counter equal the counts stored in the second counter; and comparing the charge on the second capacitor with the signal indicative of latest speed to provide a speed control signal for controlling speed of the vehicle.

7. The method of claim 6 further including incrementing the counts stored in the second counter when it is desired to increase speed of the vehicle over the speed of the vehicle when the counts were stored in the second counter.

8. A cruise control system having means to provide a signal representative of a desired cruising speed and a servo control to regulate the cruising speed, comprising; a first capacitor; a current source for providing a current to the first capacitor to charge the first capacitor; a first frequency generator; a first counter to accumulate counts of a frequency generated by the first frequency generator; a comparator to compare magnitude of the charge on the first capacitor against the signal representative of the desired cruising speed; a second counter capable of following the count in the first counter; means to latch the count in the second counter and reset the first counter when the comparator indicates the charge on the first capacitor substantially equals magnitude of the signal representative of the cruising speed; a digital comparator to compare counts latched in the second counter against counts being accumulated in the first counter; means to inhibit the first capacitor from being charged further after the digital comparator indicates equality of counts being compared; a second capacitor; and means to transfer the charge on the first capacitor to the second capacitor so that the charge on the second capacitor can be compared against the signal representative of the cruising speed to provide an output to the servo control.

9. The cruise control system of claim 8 wherein the means to inhibit is in parallel with the first capacitor thereby permitting the first capacitor to be discharged once the desired charge has been reached.

10. The cruise control system of claim 8 further having means to increment the count latched in the second counter thereby providing capability to increase the cruising speed.

11. A speed control system having means to provide a signal indicative of speed of a device and a servo control to control the speed of the device, comprising: means for storing a voltage which corresponds to speed of the device; means for incrementing a first counter until the voltage stored in the means for storing substantially equals in magnitude the signal indicative of speed of the device; means for saving a count accumulated in the first counter; means for allowing the means for storing a voltage to be repeatedly charged for a period of time corresponding to the count saved in the means for saving a count; and means for comparing the stored voltage against a signal indicative of present speed of the device so that a correction can be made to speed of the device if the present speed of the device is different from a predetermined speed.

12. A method of controlling speed of a vehicle, comprising: storing a voltage which corresponds to speed of the vehicle; incrementing a first counter by an oscillator until the stored voltage has ramped from a reference voltage to a voltage equal to voltage representative of vehicle speed; storing in a latch counter a count accumulated in the first counter when the stored voltage has ramped to a voltage corresponding to vehicle speed; allowing the stored voltage to repeatedly ramp to the voltage representative of vehicle speed by permitting storing for a period of time corresponding to the count stored in the latch counter; transferring through a buffer the stored voltage to a capacitor so that the voltage on the capacitor can be compared to a signal representing vehicle speed thereby providing a signal to control speed of the vehicle.

* * * * *